US012686438B2

(12) United States Patent
Kikuchi

(10) Patent No.: US 12,686,438 B2
(45) Date of Patent: Jul. 21, 2026

(54) VEHICLE CONTROL DEVICE AND VEHICLE CONTROL METHOD

(71) Applicant: TOYOTA JIDOSHA KABUSHIKI KAISHA, Toyota (JP)

(72) Inventor: Takuro Kikuchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 18/981,663

(22) Filed: Dec. 16, 2024

(65) Prior Publication Data

US 2025/0282421 A1     Sep. 11, 2025

(30) Foreign Application Priority Data

Mar. 5, 2024     (JP) ................................. 2024-032982

(51) Int. Cl.
B62D 15/02          (2006.01)
B60W 30/12          (2020.01)
B60W 50/14          (2020.01)

(52) U.S. Cl.
CPC ........... B62D 15/025 (2013.01); B60W 30/12 (2013.01); B60W 50/14 (2013.01)

(58) Field of Classification Search
CPC ..... B62D 15/025; B60W 30/12; B60W 50/14; B60W 50/12
See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,714,034 B2 | 7/2017 | Otake et al. | |
| 9,880,558 B2 | 1/2018 | Nakamura | |
| 9,902,399 B2 | 2/2018 | Torii et al. | |
| 10,345,443 B2 | 7/2019 | Masui et al. | |
| 10,611,240 B2 | 4/2020 | Masui et al. | |
| 2019/0217883 A1 | 7/2019 | Ozawa et al. | |
| 2021/0245740 A1* | 8/2021 | George .......... | B60W 30/18163 |

(Continued)

FOREIGN PATENT DOCUMENTS

| | | |
|---|---|---|
| JP | 2019-123402 A | 7/2019 |
| JP | 2021-099541 A | 7/2021 |

*Primary Examiner* — Sizo B Vilakazi
(74) *Attorney, Agent, or Firm* — SoraIP, Inc.

(57)          ABSTRACT

A vehicle control device capable of autonomously controlling the steering of a vehicle includes: a necessity determination unit that determines whether offset travel offset from a center of a traveling lane to a side opposite to an opposite lane side is necessary based on a state of an oncoming lane; an execution determination unit that determines whether an execution condition for executing offset travel is satisfied based on a road state on a side opposite to an oncoming lane side of the vehicle when offset travel is necessary; and a vehicle control unit that controls the vehicle. When it is determined that the execution condition is satisfied, the vehicle control unit causes the vehicle to travel by the offset travel, and when it is determined that the execution condition is not satisfied, the vehicle control unit performs at least one of restricting the autonomous driving function and notifying the occupant.

5 Claims, 6 Drawing Sheets

(56)  References Cited

U.S. PATENT DOCUMENTS

| | | | |
|---|---|---|---|
| 2021/0387615 A1* | 12/2021 | Aoki | .................. B60W 30/095 |
| 2023/0234574 A1* | 7/2023 | Funabashi | ......... B60W 30/0956 |
| | | | 701/301 |
| 2024/0375650 A1* | 11/2024 | Kawashima | .......... B60W 30/12 |

* cited by examiner

VEHICLE CONTROL DEVICE AND VEHICLE CONTROL METHOD

CROSS-REFERENCE TO RELATED APPLICATION

This application claims priority to Japanese Patent Application No. 2024-032982 filed on Mar. 5, 2024, incorporated herein by reference in its entirety.

BACKGROUND

1. Technical Field

The present disclosure relates to a vehicle control device and a vehicle control method.

2. Description of Related Art

Conventionally, there is known a vehicle capable of autonomous steering, the vehicle being caused to travel while being shifted from the center of a lane in which the vehicle is traveling within the width of the lane (Japanese Unexamined Patent Application Publication No. 2019-123402, Japanese Unexamined Patent Application Publication No. 2021-099541, etc.). In the device described in JP 2019-123402 A, in particular, when there is another vehicle traveling in an adjacent lane adjacent to the lane in which the vehicle is traveling, the target travel trajectory of the vehicle is corrected so as to be laterally away from the other vehicle. The correction of the target travel trajectory is performed based on information on the environment on the side opposite to the adjacent lane.

SUMMARY

On a road with two-way traffic, particularly when a median strip is not provided, an oncoming vehicle travels near the host vehicle in the lateral direction. In such a case, the occupant may feel anxious if autonomous steering control for autonomous steering is performed. On the other hand, when the vehicle is caused to travel in an offset manner away from an opposite lane on a road with two-way traffic, the distance from a lane marking or any obstacle may become too short on the side of the lane in which the host vehicle is traveling opposite to the opposite lane. This may make the occupant feel anxious.

In view of the above issue, an object of the present disclosure is to suppress an occupant feeling anxious when the host vehicle approaches an oncoming vehicle or the like during autonomous steering control for autonomous steering.

The gist of the present disclosure is as follows.

(1) A vehicle control device that is able to autonomously control steering of a vehicle, the vehicle control device including:

a necessity determination unit that determines necessity of offset travel in which the vehicle is offset from a center of a traveling lane, in which the vehicle is traveling, to a side opposite to an opposite lane, in which a vehicle travels in a direction opposite to the traveling lane, based on a situation of the opposite lane;

an execution determination unit that determines whether an execution condition for executing the offset travel is met based on a road condition on a side of the vehicle opposite to the opposite lane when the offset travel is necessary; and a vehicle control unit that controls the vehicle, in which:

the vehicle control unit causes the vehicle to travel using the offset travel when it is determined that the execution condition is met when the offset travel is necessary; and the vehicle control unit performs at least one of restricting an autonomous driving function and notifying an occupant when it is determined that the execution condition is not met when the offset travel is necessary.

(2) A vehicle control method that is able to autonomously control steering of a vehicle, the vehicle control method including:

determining necessity of offset travel in which the vehicle is offset from a center of a traveling lane, in which the vehicle is traveling, to a side opposite to an opposite lane, with traffic in a direction opposite to the traveling lane, based on a situation of the opposite lane; determining whether an execution condition for executing the offset travel is met based on a road condition on a side of the vehicle opposite to the opposite lane when the offset travel is necessary;

causing the vehicle to travel using the offset travel when it is determined that the execution condition is met when the offset travel is necessary; and performing at least one of restricting an autonomous driving function and notifying an occupant when it is determined that the execution condition is not met when the offset travel is necessary.

According to the present disclosure, it is possible to suppress an occupant feeling anxious when the host vehicle approaches an oncoming vehicle or the like during autonomous steering control for autonomous steering.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
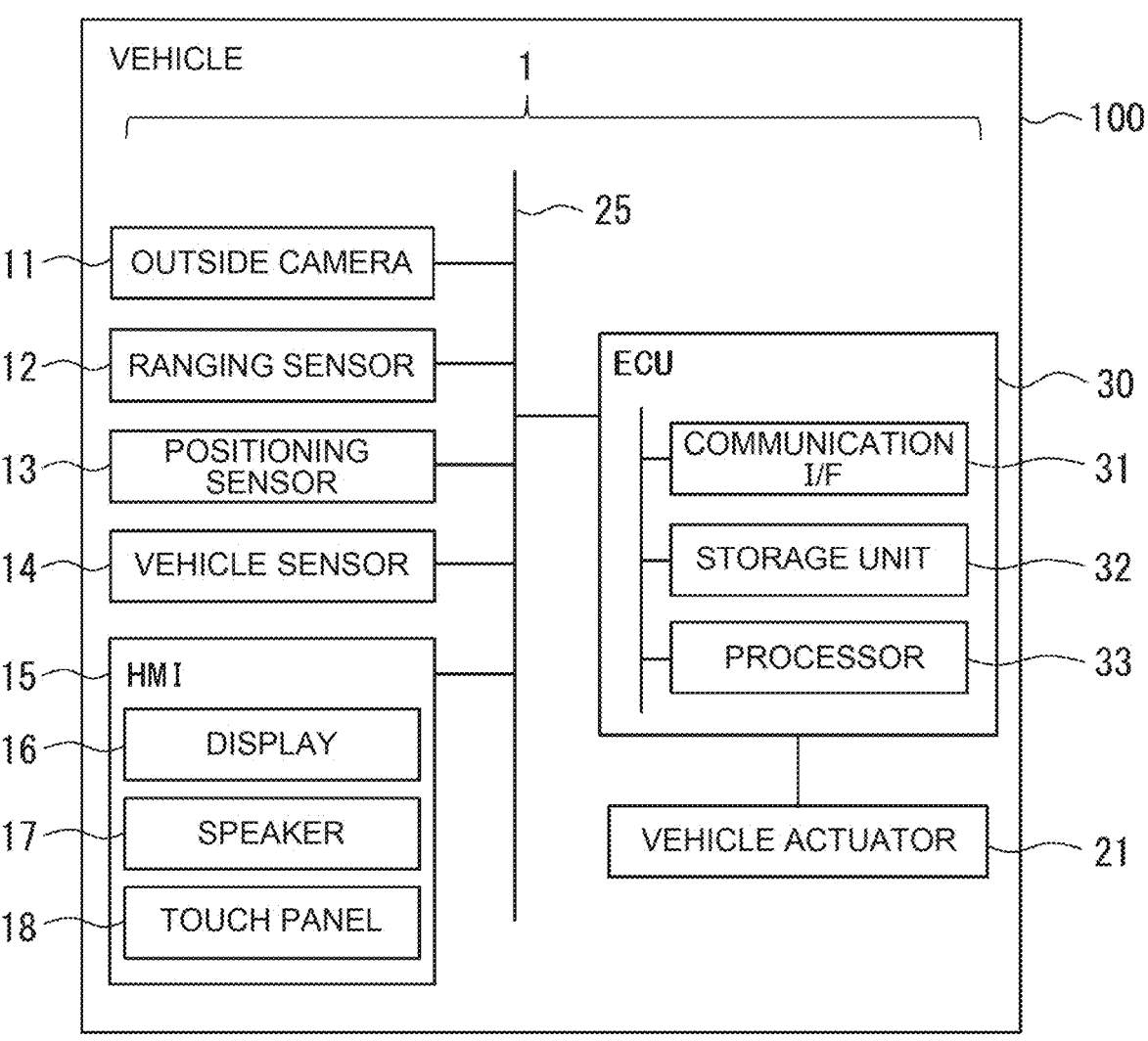
FIG. 1 is a schematic block diagram illustrating a configuration of a vehicle control system.

Hereinafter, embodiments will be described in detail with reference to the drawings. In the following description, the same reference numerals are given to the same constituent elements.

Configuration of Vehicle Control System

Referring to FIG. 1, a configuration of a vehicle control system 1 including a vehicle control device according to an embodiment will be described. The vehicle control device is a device that controls the vehicle 100, and in particular, can autonomously control acceleration/deceleration and steering of the vehicle 100. FIG. 1 is a schematic block diagram illustrating a configuration of a vehicle control system 1.

The vehicle control system 1 is mounted on the vehicle 100 and controls acceleration/deceleration and steering of the vehicle 100. As illustrated in FIG. 1, in the present embodiment, the vehicle control system 1 includes an outside camera 11, a ranging sensor 12, a positioning sensor 13, a vehicle sensor 14, a human machine interface (HMI) 15, a vehicle actuator 21, and an electronic control unit (hereinafter, referred to as "ECU") 30. The outside camera 11, the ranging sensor 12, the positioning sensor 13, the vehicle sensor 14, HMI 15, and ECU 30 are communicably connected via, for example, the in-vehicle network 25. The in-vehicle network 25 is, for example, a network conforming to a standard such as CAN (Controller Area Network). Further, ECU 30 is connected to the vehicle actuator 21 via a signaling line.

The outside camera 11 is a device that captures an image of the surroundings of the vehicle. In the present embodiment, the outside camera 11 captures an image of the front of the vehicle 100. The outside camera 11 is, for example, a CMOS (Complementary Metal-Oxide-Semiconductor) camera or a CCD (Charge-Coupled Device) camera that is sensitive to visible-light. In the present embodiment, the outside camera 11 is mounted in the vehicle of the vehicle 100, for example, so as to face the front of the vehicle 100. The outside camera 11 captures an image of a front region of the vehicle 100 at predetermined imaging cycles, and generates an image in which the front region is captured. Each time an image is generated, the outside camera 11 outputs the generated image to ECU 30 via the in-vehicle network 25.

The ranging sensor 12 is a sensor that measures a distance to an object existing around the vehicle 100. In the present embodiment, the ranging sensor 12 measures a distance to an object existing in front of the vehicle 100. For example, the ranging sensor 12 may measure a distance to a preceding vehicle of the vehicle 100. The ranging sensor 12 is, for example, a radar such as a millimeter-wave radar or a LIDAR. The ranging sensor 12 outputs distance-information to the surrounding objects at predetermined intervals to ECU 30 via the in-vehicle network 25.

The positioning sensor 13 is a device that measures the self-position of the vehicle 100. The positioning sensor 13 is, for example, a GNSS receiver. GNSS receiver receives GNSS signals from the plurality of GNSS satellites and measures the self-position of the vehicle 100 based on the received GNSS signals. The positioning sensor 13 outputs the self-position information of the vehicle 100 to ECU 30 via the in-vehicle network 25 at predetermined intervals. Note that the positioning sensor 13 may be a receiver conforming to another satellite positioning system as long as it can measure the self-position of the vehicle 100.

The vehicle sensor 14 is a sensor that detects a state of the vehicle 100. The vehicle sensor 14 detects a traveling state and an operation state of the vehicle 100. The vehicle sensor 14 includes, for example, a speed sensor, an acceleration sensor, and a yaw rate sensor as sensors for detecting the traveling state of the vehicle 100. The speed sensor detects the speed of the vehicle 100. The acceleration sensor detects acceleration of the vehicle 100. The yaw rate sensor detects a change speed (yaw rate) of the yaw angle when the vehicle 100 turns. In addition, the vehicle sensor 14 includes, for example, a grip sensor that detects whether the driver grips the steering wheel (or touches the steering wheel) as a sensor that detects an operation state of the vehicle 100. The vehicle sensor 14 outputs the detection result to ECU 30 at predetermined intervals via the in-vehicle network 25.

HMI 15 is an interface for inputting and outputting data between a driver or an occupant and the vehicle control system 1. HMI 15 includes an information providing device for providing various types of information to a driver or an occupant, and an input device for the driver or the occupant to perform an input operation.

Specifically, HMI 15 includes a display 16 for displaying character information or picture information as an information providing device. The display 16 is any type of display device such as a liquid crystal display or an organic EL display. The display 16 receives an image signal from ECU 30 via the in-vehicle network 25, and displays an image in accordance with the image signal. HMI 15 also includes a speaker 17 for outputting sound as an information-providing device. The speaker 17 receives an audio signal from ECU 30 via the in-vehicle network 25, and outputs audio in accordance with the audio signal. HMI 15 may include, as the information providing device, a device (for example, a vibrating device) other than the display 16 and the speaker 17 that provides various kinds of information to the drivers or the occupants.

In addition, HMI 15 has, as an input device, a touch panel 18 on which input is performed by a driver or a passenger touching. The touch panel 18 outputs an operation signal to ECU 30 via the in-vehicle network 25 when the driver or the occupant performs an operation by touching. HMI 15 may include, as the input device, a device (for example, a button, a switch, or the like) other than the touch panel 18 for the driver or the occupant to perform the input manipulation.

The vehicle actuator 21 is an actuator used to control the operation of the vehicle 100. Specifically, the vehicle actuator 21 includes, for example, a drive actuator, a braking actuator, and a steering actuator. The drive actuator controls an internal combustion engine or an electric motor for driving the vehicle 100. The braking actuator controls a brake for braking the vehicle 100. The steering actuator controls steering of the vehicle 100. The vehicle actuator 21 controls acceleration, braking, and steering of the vehicle 100 in accordance with a control signal transmitted from ECU 30 via a signal line.

Configuration of Vehicle Control Device

ECU 30 functions as a vehicle control device that autonomously controls acceleration/deceleration and steering of the vehicle 100. Thus, ECU 30 controls the actuation of the vehicle actuator 21. In particular, in the present embodiment, ECU 30 autonomously controls the steering of the vehicle 100 (autonomous steering control) when there is an autonomous steering demand for autonomously controlling the steering from the user. At this time, for example, ECU 30 controls the steering of the vehicle 100 so that the vehicle 100 travels along the center in the width direction of the traveling lane in which the vehicle 100 is traveling (hereinafter, the center in the width direction of the lane is also simply referred to as the "center of the lane").

Further, ECU 30 controls information to be provided from the information providing device of HMI 15. Therefore, ECU 30 controls the images displayed on the display 16 and the sound outputted from the speaker 17. As illustrated in FIG. 1, ECU 30 includes a communication interface 31, a storage unit 32, and a processor 33.

The communication interface 31 is a circuit for connecting ECU 30 to the in-vehicle network 25. The storage unit 32 stores data. The storage unit 32 includes, for example, at least one of a volatile semiconductor memory, a nonvolatile semiconductor memory, a hard disk drive (HDD), and a solid state drive (SSD). The storage unit 32 stores a computer program executed by the processor 33 of ECU 30. Further, the storage unit 32 stores data used in a computer program executed by the processor 33, such as data transmitted from the outside camera 11 or the like.

The processor 33 comprises one or more CPU (Central Processing Unit) and its peripheral circuitry. The processor 33 may further include other arithmetic circuits such as a logical arithmetic unit or a numerical arithmetic unit. The processor 33 executes a computer program stored in the storage unit 32.

Figure 2:
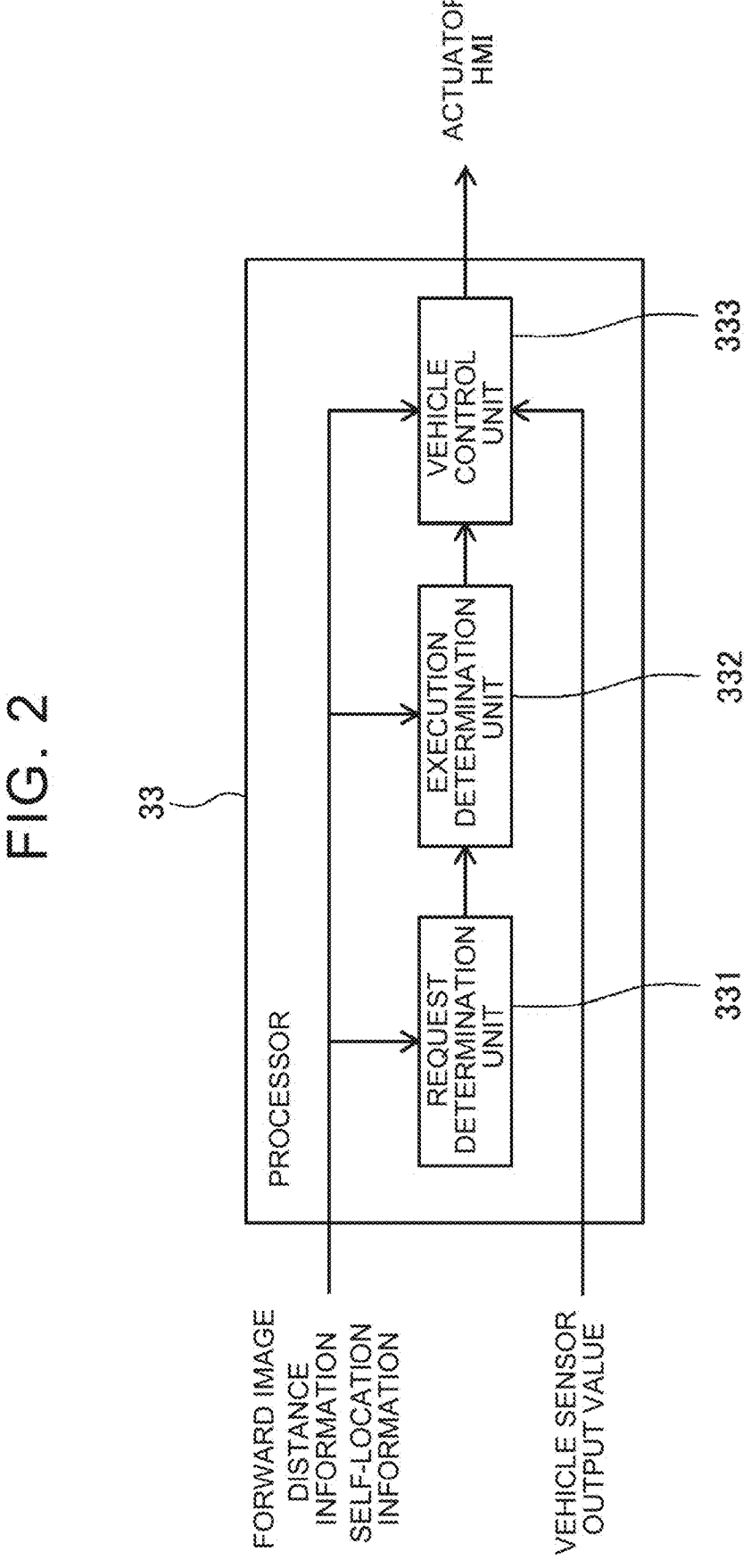
FIG. 2 is a functional diagram of a processor of an ECU.

FIG. 2 is a functional diagram of the processor 33 of ECU 30. As illustrated in FIG. 2, the processor 33 includes a necessity determination unit 331, an execution determination unit 332, and a vehicle control unit 333.

The necessity determination unit 331 determines whether or not offset travel is necessary, which is offset from the center of the traveling lane to the opposite side of the traveling lane side, during execution of the autonomous steering control, on the basis of the state of the opposite lane on which the vehicle travels in a direction opposite to the traveling lane on which the vehicle 100 is traveling. In particular, in the present embodiment, the necessity determination unit 331 determines that offset travel is necessary when the distance in the width direction between the traveling lane and the oncoming lane is short or when the distance in the width direction between the vehicle 100 and the oncoming vehicle traveling on the oncoming lane is short. The front image generated by the outside camera 11 is input to the necessity determination unit 331. Further, the self-position information measured by the positioning sensor 13 may be input to the necessity determination unit 331. On the other hand, the necessity determination unit 331 outputs the necessity of the offset travel to the execution determination unit 332.

In the present embodiment, the state of the oncoming lane includes a distance D between the center of the traveling lane and the end of the oncoming lane on the traveling lane side in the width direction (hereinafter, referred to as "distance from the end of the oncoming lane"). Therefore, the necessity determination unit 331 determines the necessity of the offset travel based on the distance D from the end of the oncoming lane. In particular, in the present embodiment, the necessity determination unit 331 determines that offset travel is required when the distance D from the end of the oncoming lane is less than the predetermined reference distance Dref. On the other hand, when the distance D from the end of the oncoming lane is equal to or larger than the predetermined reference distance Dref, the necessity determination unit 331 determines that the offset-traveling is not necessary.

Figure 3:
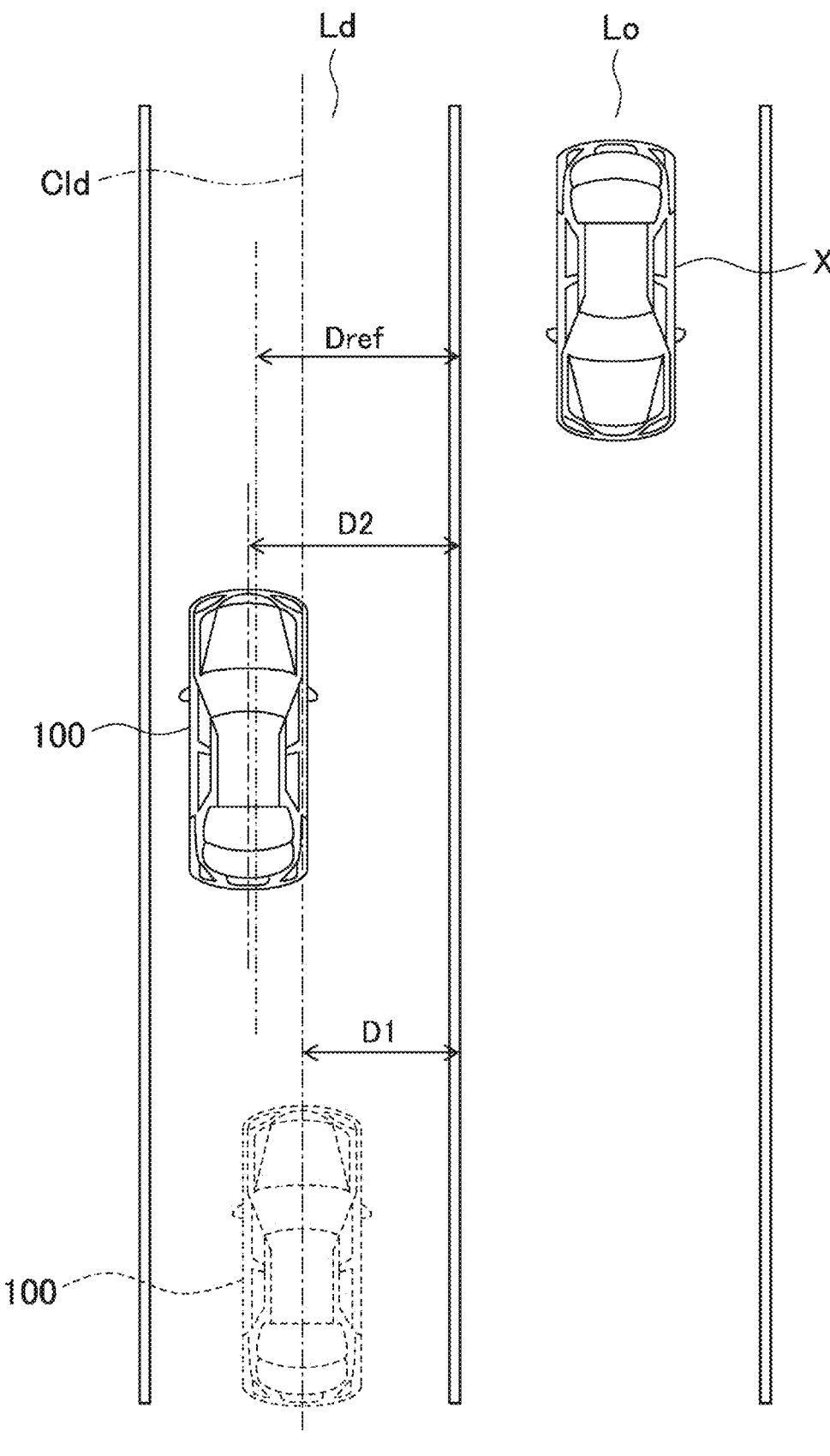
FIG. 3 is a diagram schematically illustrating a state in which a vehicle is traveling in a traveling lane.

FIG. 3 is a diagram schematically illustrating a state in which the vehicle 100 is traveling in the traveling lane Ld. The road shown in FIG. 3 is a face-to-face road, and the opposite lane Lo is located next to the traveling lane Ld in the widthwise direction.

In the embodiment illustrated by a broken line in FIG. 3, the distance D between the center Cld of the traveling lane Ld and the end of the opposite lane Lo (the distance between the end of the opposite lane) is D1. In FIG. 3, it is assumed that the vehicle 100 travels in the center in the widthwise direction in the traveling lane Ld during the autonomous steering control. However, in the embodiment shown in FIG. 3, the distance D1 is a distance that is shorter than the reference distance Dref. Therefore, the necessity determination unit 331 determines that the vehicle 100 needs to travel offset from the center of the traveling lane Ld in the vehicle width direction toward an opposite side from the oncoming lane Lo side (away from the oncoming lane side).

Specifically, the necessity determination unit 331 performs image processing on the front image input from the outside camera 11 to recognize the division line. An arbitrary recognition method such as a Hough transform is used to recognize the division line. In addition, the necessity determination unit 331 recognizes the traveling lane and the oncoming lane on the basis of the recognized lane division. Determination of whether each lane sandwiched between the two lanes is a traveling lane or an opposite lane is performed based on a line type (a difference in a solid line, a broken line, a color, and the like) of the lane, the number of lanes, and the like obtained by the recognition processing of the lane. In addition, in a case where a high-precision map including the number of lanes, the position, and the like is stored in the storage unit 32, the traveling lane and the oncoming lane may be recognized on the basis of the position information detected by the high-precision map and the positioning sensor 13 in addition to the recognized division line.

Thereafter, the necessity determination unit 331 determines whether the traveling lane Ld of the vehicle 100 is a lane adjoining the oncoming lane Lo. Then, when the traveling lane Ld of the vehicle 100 is a lane adjoining the oncoming lane Lo, the necessity determination unit 331 calculates a distance D between the division line of the oncoming lane Lo on the traveling lane Ld side and the center of the traveling lane Ld. The lane division of the oncoming lane Lo on the traveling lane Ld side is recognized by the recognition process described above, and the center of the traveling lane Ld is calculated based on the lane divisions that are on both sides of the vehicle 100 and recognized by the recognition process. Then, the necessity determination unit 331 determines whether the distance D calculated in this way is less than a preset reference distance Dref, and determines that offset-running is required when the distance D is less than the reference distance Dref.

In the present embodiment, as the condition of the oncoming lane, the necessity of the offset travel is determined by using the distance (distance from the end of the oncoming lane) D between the center of the traveling lane Ld and the end of the oncoming lane Lo on the traveling lane Ld in the widthwise direction. However, as long as the distance in the width direction between the traveling lane Ld and the oncoming lane Lo and the distance in the width direction or the distance between the vehicle 100 and the oncoming vehicle traveling on the oncoming lane Lo is expressed, a parameter other than the distance D to the end of the oncoming lane may be used as the condition of the oncoming lane.

Specifically, as the condition of the oncoming lane, a widthwise distance between the center of the traveling lane Ld and the center of the oncoming lane Lo may be used. In addition, as the condition of the oncoming lane, a distance in the width direction between an end of the traveling lane Ld on the oncoming lane Lo side in the width direction and an end of the oncoming lane Lo on the traveling lane Ld side in the width direction may be used. Alternatively, as the condition of the opposite lane, a distance in the width direction between the end of the traveling lane Ld on the opposite lane Lo side and the center of the opposite lane Lo may be used as the condition of the opposite lane.

In addition, as the condition of the oncoming lane, the distance between the vehicle 100 (the end on the center or on the oncoming lane Lo) and the oncoming vehicle X (the end on the center or on the traveling lane Ld) traveling in the oncoming lane Lo may be used. Alternatively, as the condition of the oncoming lane, the distance between the vehicle 100 (the center or the oncoming lane Lo side end) and the oncoming lane Lo (the center or the traveling lane Ld side end) may be used. Further, as the condition of the oncoming lane, the distance between the traveling lane Ld (the center or the oncoming lane Lo side end) and the oncoming vehicle X (the center or the traveling lane Ld side end) may be used. Even when any distance is used as the condition of the oncoming lane, it is determined that offset travel is necessary when the distance is less than the reference distance, and it is determined that offset travel is not necessary when the distance is equal to or greater than the reference distance.

In addition, the presence or absence of the oncoming vehicle X may be used as a situation of the oncoming lane. In this case, for example, when the oncoming vehicle X is traveling, the reference distance is set to be longer than when the oncoming vehicle X is not traveling.

When the offset travel is required, the execution determination unit 332 determines whether or not the execution condition for executing the offset travel is satisfied based on the road condition on the other side of the vehicle 100 from the oncoming lane Lo. In the present embodiment, the execution determination unit 332 determines that the execution condition is satisfied when the distance between the vehicle 100 and the demarcation line is apart from the oncoming lane Lo of the vehicle 100, when the distance between the vehicle 100 and the curbstone is short, or when the distance between the vehicle and an obstacle located on the road shoulder or the like is short. The execution determination unit 332 receives the front image generated by the outside camera 11 and the distance information of the ranging sensor 12. Further, the self-position information measured by the positioning sensor 13 may be input to the execution determination unit 332. On the other hand, the execution determination unit 332 outputs the determination result of the execution condition success/failure of the offset travel to the vehicle control unit 333.

Figure 4:
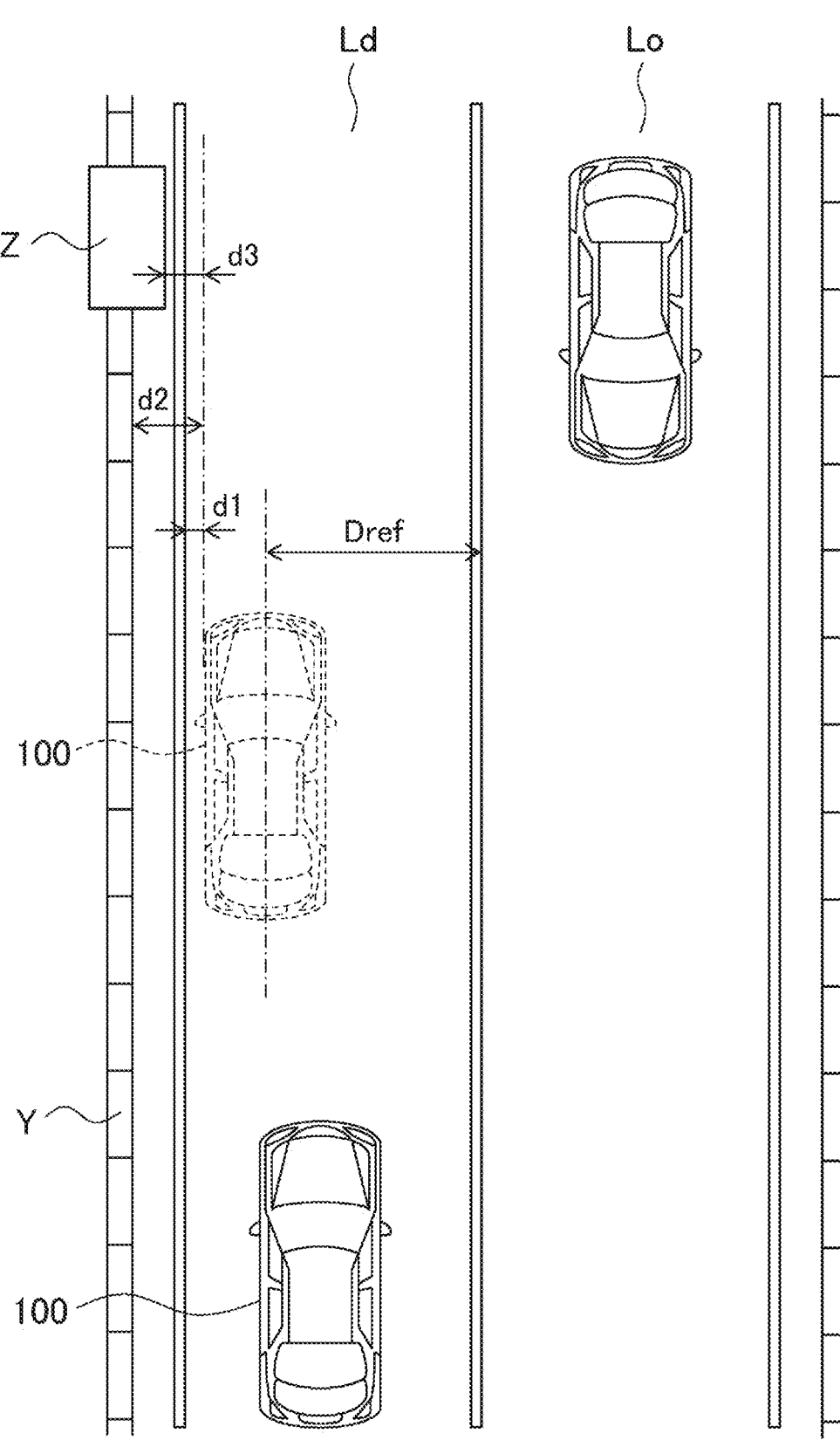
FIG. 4 is a view similar to FIG. 3 showing the vehicle traveling in a traveling lane.

Referring to FIG. 4, the roadway condition on the other side of the vehicle 100 from the oncoming lane Lo side will be described. FIG. 4 is a view similar to FIG. 3, showing a state in which the vehicle 100 is traveling in the traveling lane Ld. The road shown in FIG. 4 is also a face-to-face road, and the opposite lane Lo is located next to the traveling lane Ld in the widthwise direction.

In the present embodiment, the road condition on the opposite side of the vehicle 100 from the opposite lane Lo side includes distance d1 between the dividing line on the opposite side of the vehicle 100 from the opposite lane Lo side and the vehicle 100 when it is assumed that the vehicle 100 travels at a position in the reference distance Dref from the end of the opposite lane Lo (hereinafter referred to as "reference position traveling"). If this range d1 is too close, the vehicle 100 is more likely to touch other vehicles traveling in neighboring lanes or obstacles located outside of this demarcation line. Therefore, the distance d1 is equal to or larger than the predetermined lane reference distance dref1.

In the present embodiment, the road condition on the side opposite to the oncoming lane Lo side of the vehicle 100 includes the distance d2 between the curbstone (or another step defining a boundary with a sidewalk or the like) Y located on the side opposite to the oncoming lane Lo side of the vehicle 100 and the vehicle 100 while traveling at the reference position. If the distance d2 is too short, the possibility of the vehicle 100 contacting the step such as the curbstone Y is increased, and therefore, the distance d2 is equal to or larger than the predetermined step reference distance dref2.

Further, in the present embodiment, the road condition on the side opposite to the oncoming lane Lo side of the vehicle 100 includes a distance d3 between an obstacle (a pedestrian, a bicycle, a roadside object, a stopped vehicle, or the like) Z located on the side opposite to the oncoming lane Lo side of the vehicle 100 and the vehicle 100 while traveling at the reference position. When the distance d3 is too short, the possibility that the vehicle 100 touch the obstacle Z is increased, and therefore, the distance d3 is equal to or larger than the predetermined obstacle reference distance dref3. The obstacle reference range dref3 may be changed according to the type of the obstacle Z.

Therefore, the execution determination unit 332 determines that the execution condition of the offset travel is not satisfied when the distance d1 with the division line is less than the lane reference distance dref1, when the distance d2 with the curbstone Y is less than the step reference distance dref2, or when the distance d3 with the obstacle Z is less than the obstacle reference distance dref3. On the other hand, when the distance d1 with the division line is equal to or greater than the lane reference distance dref1, the distance d2 with the curbstone Y is equal to or greater than the step reference distance dref2, and the distance d3 with the obstacle Z is equal to or greater than the obstacle reference distance dref3, the execution determination unit 332 determines that the execution condition of the offset travel is satisfied.

The road condition of the vehicle 100 on the opposite side of the oncoming lane Lo may include elements other than the dividing lines, the step, and the obstacle. Therefore, the road condition on the side opposite to the opposite lane Lo side of the vehicle 100 may include, for example, whether another vehicle is traveling in the different traveling lane in a case where there is another traveling lane on the side opposite to the opposite lane Lo side of the traveling lane Ld, whether the other vehicle is approaching the vehicle 100 in a case where the other vehicle is traveling, and the like.

Specifically, the execution determination unit 332 performs image processing on the front image input from the outside camera 11 to recognize an object such as a demarcation line, a curbstone Y, and an obstacle Z. In addition, the execution determination unit 332 calculates the distance to the recognized object such as the curbstone Y and the obstacle Z based on the distance information input from the ranging sensor 12. In particular, at this time, the execution determination unit 332 calculates not only the distance between the vehicle 100 and the curbstone Y, the obstacle Z, or the like, but also the distance between the vehicle 100 and the curbstone Y, the obstacle Z, or the like during traveling at the reference position.

The vehicle control unit 333 controls the vehicle 100. In the present embodiment, the vehicle control unit 333 controls the operation of the vehicle 100 and controls the notification to the occupant. In particular, in the present embodiment, the vehicle control unit 333 can autonomously control the acceleration/deceleration and the steering of the vehicle 100 by autonomously controlling the operation of the vehicle actuator 21. In addition, in the present embodiment, the vehicle control unit 333 controls notification to the occupant via HMI 15 information-providing device. The vehicle control unit 333 receives the front image input from the outside camera 11, the distance information of the ranging sensor 12, and the self-position information of the positioning sensor 13. Further, an output value of the vehicle sensor 14 is input to the vehicle control unit 333. Further, the vehicle control unit 333 outputs a control signal to the vehicle actuator 21 and outputs a notification signal to HMI 15.

In the present embodiment, the vehicle control unit 333 controls the operation of the vehicle actuator 21 so that the vehicle 100 is autonomously traveled by the offset traveling when it is determined that the execution condition of the offset traveling is satisfied when the offset traveling is necessary. On the other hand, when it is determined that the execution condition of the offset travel is not satisfied when the offset travel is necessary, the vehicle control unit 333 performs at least one of restricting the autonomous driving function and notifying the occupant that the offset travel is impossible.

Specifically, in the present embodiment, the vehicle control unit 333 performs autonomous steering control of the vehicle 100 so as to perform the offset travel when the necessity determination unit 331 determines that the offset travel is necessary and the execution determination unit 332 determines that the execution condition of the offset travel is satisfied. That is, in such a case, the vehicle control unit 333 controls the vehicle actuator 21, in particular, the steering actuator, so as to perform the offset travel. Specifically, the vehicle control unit 333 calculates a traveling route of the vehicle 100 for performing offset traveling based on high-precision map information, self-position information, and the like, such as a front image input from the outside camera 11. Then, the vehicle control unit 333 controls the steering actuator based on the output of the vehicle sensor 14 or the like so that the vehicle 100 travels along the travel route.

Consequently, the vehicle 100 is autonomously steered so as to travel while maintaining a distance D2 between the center of the vehicle 100 and the end of the oncoming lane equal to or greater than a predetermined reference distance Dref, as indicated by a solid line in FIG. 3. In addition, in this case, the driver of the vehicle 100 does not need to control the steering of the vehicle 100, and therefore, the vehicle control unit 333 does not cause HMI 15 information-providing device to issue a hands-on-request notification prompting the driver to grip the steering wheel.

On the other hand, in the present embodiment, the vehicle control unit 333 does not perform the autonomous steering control of the vehicle 100 when the necessity determination unit 331 determines that the offset travel is necessary and the execution determination unit 332 determines that the execution condition of the offset travel is not satisfied. That is, in such a case, the vehicle control unit 333 does not control the vehicle actuator 21, in particular, the steering actuator. Therefore, in this case, the driver of the vehicle 100 needs to control the steering of the vehicle 100. Therefore, the vehicle control unit 333 causes the information-providing device of HMI 15 to issue a hands-on request notification. Specifically, for example, the vehicle control unit 333 causes the display 16 to display a notification instructing the driver to grip the steering wheel, and causes the speaker 17 to output the notification.

As described above, in the present embodiment, in the case where the oncoming lane is close to the face-to-face traffic road, the autonomous steering control is basically performed so as to travel by the offset travel. Therefore, the oncoming vehicle is suppressed from traveling near the vehicle 100, and the occupant's feeling of anxiety is reduced. However, in the present embodiment, when it is determined that the execution condition for executing the offset travel is not satisfied based on the road condition on the opposite side of the oncoming lane side of the vehicle 100, the driver performs the steering control without performing the autonomous steering control. Thus, when the road condition on the side opposite to the oncoming lane side of the vehicle 100 is a condition in which, for example, a road shoulder or an obstacle is close, the autonomous steering control is not performed, and the steering control by the driver is performed. Therefore, in such a case, the occupant's feeling of anxiety is reduced.

Steering Process by Vehicle Control Device

Figure 5:
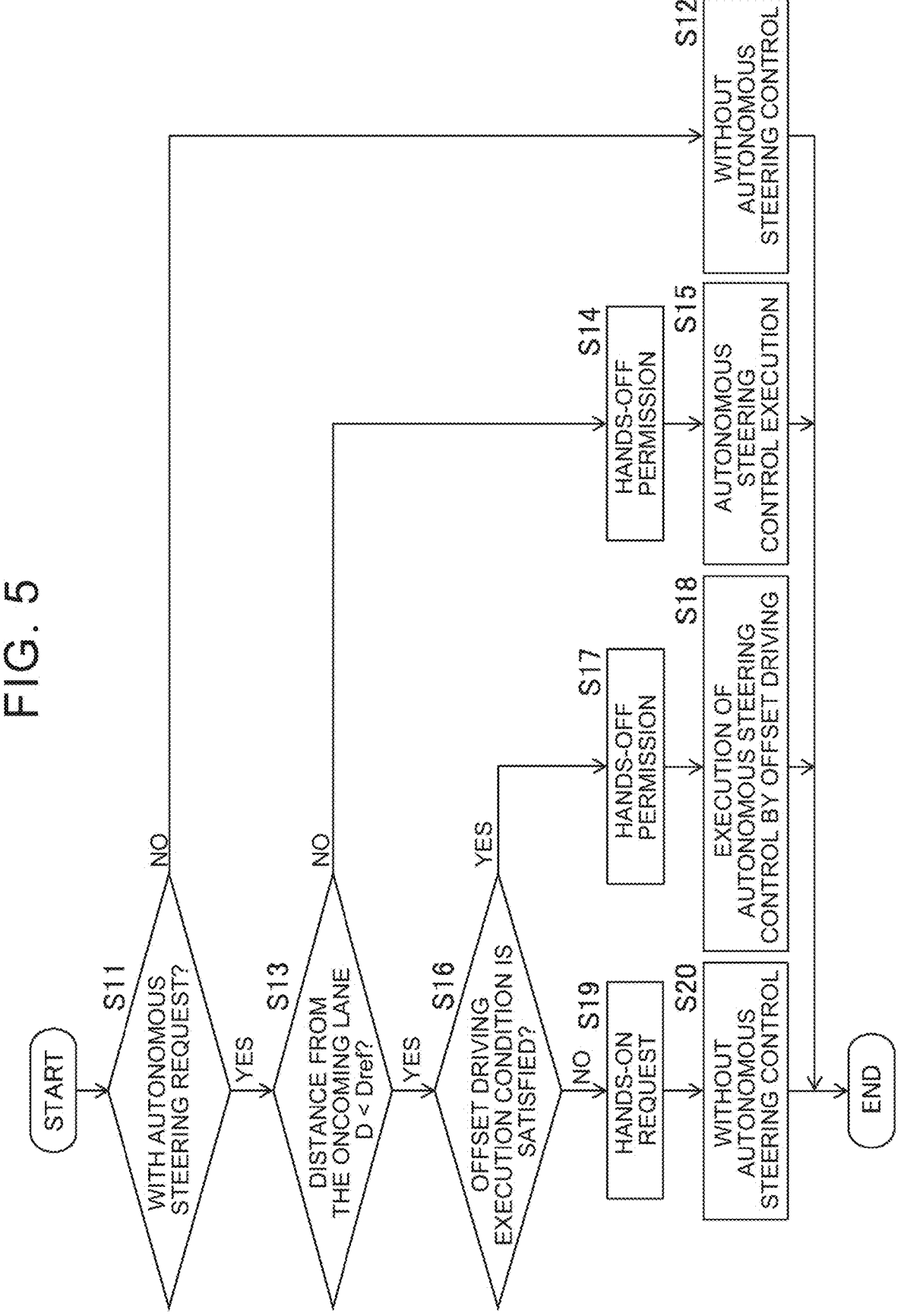
FIG. 5 is a flow chart of a steering process for vehicles.

FIG. 5 is a flowchart related to a steering process of the vehicle 100. The illustrated steering process is executed by the processor 33 of ECU 30 at regular intervals.

When the steering process is started, first, the necessity determination unit 331 determines whether autonomous steering control is required (S11). The demand for the autonomous steering control is input by the occupant via the touch panel 18 or another input device on HMI 15 of the vehicle 100, for example. Specifically, for example, ON·OFF of the autonomous driving control including the autonomous steering control and the autonomous acceleration/deceleration control is selected by the occupant. Then, the necessity determination unit 331 determines that there is a request for the autonomous steering control when ON of the autonomous driving control is selected, and determines that there is no request for the autonomous steering control when OFF of the autonomous driving control is selected. When it is determined in S11 that the autonomous steering control is not required, the vehicle control unit 333 does not execute the autonomous steering control (S12). Therefore, the steering control by the driver is performed.

When it is determined in S11 that there is a request for autonomous steering control, the necessity determination unit 331 determines whether or not the distance D from the end of the oncoming lane is less than the reference distance Dref, that is, whether or not offset travel is required (S13). When it is determined in S13 that the distance D is equal to or larger than the reference distance Dref, hands-off is permitted, and therefore, the vehicle control unit 333 does not notify the hands-on request (S14). In addition, in such cases, the vehicle control unit 333 executes the autonomous steering control in the normal traveling without performing the off-set traveling (S15). Therefore, the vehicle control unit 333 controls the vehicle actuator 21, in particular, the steering actuator, so that the vehicle 100 travels in the center of the traveling lane.

When it is determined in S13 that the distance D is less than the reference distance Dref, that is, when it is determined that the offset travel is required, the execution determination unit 332 determines whether or not the execution condition of the offset travel is satisfied (S16). When it is determined in S16 that the condition for executing the offset-running is satisfied, the hands-off is allowed, and therefore, the vehicle control unit 333 does not perform the hands-on-request notification (S17). In addition, in such a case, the vehicle control unit 333 executes the autonomous steering control in the offset travel. Therefore, the vehicle control unit 333 controls the vehicle actuator 21, in particular, the steering actuator, so that the vehicle 100 travels on the side opposite to the opposite lane side from the center of the traveling lane. On the other hand, when it is determined that S16 does not satisfy the condition for executing the offset-running, the vehicle control unit 333 causes HMI 15 information-providing device to issue a hands-on-request notification (S19). In addition, in such cases, the vehicle control unit 333 does not execute the autonomous steering control after it is detected by the driver that the steering wheel has been gripped (S20). Therefore, the steering control by the driver is performed.

Modification

Hereinafter, a modification of the above-described embodiment will be described. In the above-described embodiment, when the offset traveling is required and the execution condition of the offset traveling is satisfied, the autonomous steering control by the offset traveling is performed without the hands-on request notification. On the other hand, when the offset traveling is necessary and the execution condition of the offset traveling is not satisfied, a hands-on request notification is performed, and the autonomous steering control is not performed.

On the other hand, in the first modification, when the offset travel is necessary and the execution condition of the offset travel is satisfied, the vehicle control unit 333 performs the autonomous steering control by the offset travel. Therefore, in this case, the vehicle control unit 333 does not perform the hands-on request notification. At this time, the vehicle control unit 333 controls the speed of the vehicle 100 so that the speed of the vehicle 100 becomes the same as the speed in the normal travel in which the offset travel is not required. That is, the vehicle control unit 333 controls the vehicle actuator 21, in particular, the drive actuator and the braking actuator so that the speed of the vehicle 100 becomes such a speed.

On the other hand, in the first modification, when the offset travel is required and the execution condition of the offset travel is not satisfied, the vehicle control unit 333 executes the autonomous steering control in the normal travel without the offset travel. In this case, the vehicle control unit 333 does not issue a hands-on request notification. In addition, the vehicle control unit 333 controls the speed of the vehicle 100 so that the speed of the vehicle 100 becomes a speed lower than the speed in the normal travel in which the offset travel is not necessary. That is, when it is determined that the execution condition of the offset travel is not satisfied, the vehicle control unit 333 decreases the speed of the vehicle 100 as compared with the case where it is determined that the execution condition of the offset travel is satisfied.

At this time, the vehicle control unit 333 may control the speed of the vehicle 100 such that the speed is slower by a predetermined constant speed or a constant ratio than the speed in normal traveling. Alternatively, the vehicle control unit 333 may control the speed of the vehicle 100 such that the speed is slower by a speed corresponding to the distance D from the end of the oncoming lane than the speed in normal traveling. In this case, the speed of the vehicle 100 is controlled so that the speed of the vehicle 100 becomes slower as the distance D from the end of the oncoming lane becomes shorter.

Figure 6:
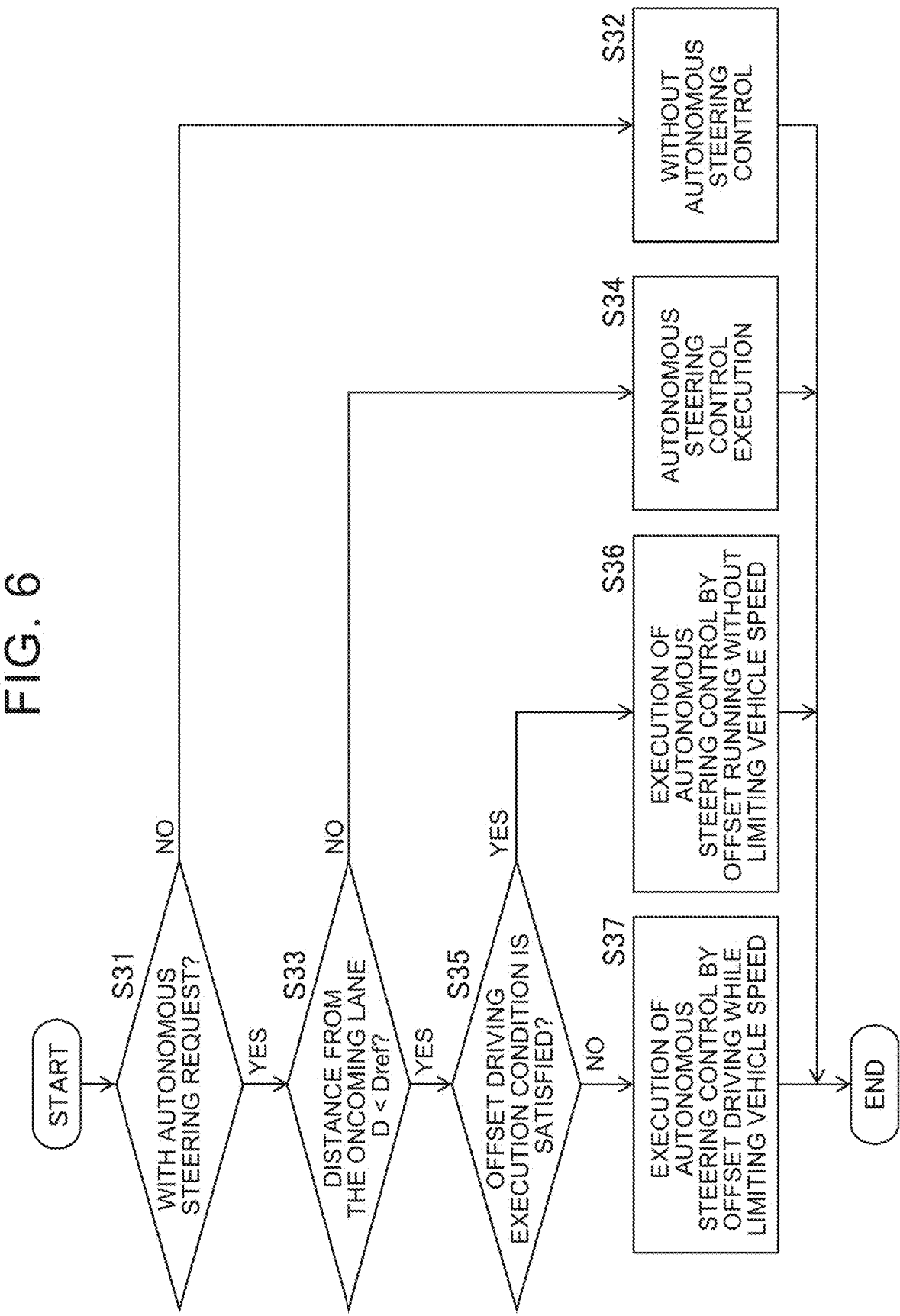
FIG. 6 is a flowchart related to a steering process of a vehicle according to a first modification.

FIG. 6 is a flowchart related to a steering process of the vehicle 100 according to the first modification. The illustrated steering process is executed by the processor 33 of ECU 30 at regular intervals. S31-S35 in FIG. 6 are the same as those in S11-S13, S15, S16 of FIG. 5, and therefore will not be described.

When it is determined in S35 that the execution condition of the offset travel is satisfied, the vehicle control unit 333 executes the autonomous steering control in the offset travel (S36). At this time, the vehicle control unit 333 controls the speed of the vehicle 100 so that the speed becomes the same as the speed in the normal travel in which the offset travel is not performed. On the other hand, when it is determined in S35 that the execution condition of the offset travel is not satisfied, the vehicle control unit 333 executes the autonomous steering control in the normal travel without performing the offset travel. At this time, the vehicle control unit 333 limits the speed of the vehicle 100 to a speed slower than the speed in the normal travel in which the offset travel is not necessary.

In the first modification, when it is determined that the execution condition for executing the offset travel based on the road condition on the opposite side to the oncoming lane side of the vehicle 100 is not satisfied, the autonomous steering control is performed, but the speed of the vehicle 100 is reduced. This reduces the feeling of anxiety for the occupant.

In addition, in the second modification, when the offset travel is necessary and the execution condition of the offset travel is satisfied, the vehicle control unit 333 performs autonomous steering control by the offset travel. Further, in the second modification, when the offset travel is necessary and the execution condition of the offset travel is satisfied, the vehicle control unit 333 executes the autonomous steering control in the normal travel without performing the offset travel. In addition, in this case, the vehicle control unit 333 issues a notification indicating a warning to the occupant of the vehicle 100. Specifically, the vehicle control unit 333 causes HMI 15 information-providing device to issue a notification that warns that the vehicle 100 is traveling in the vicinity of the oncoming lane. Thus, the driver of the vehicle 100 can determine whether it is necessary to perform the steering control of the vehicle 100 by himself/herself, and can perform the steering control as necessary. Therefore, it is suppressed that the oncoming vehicle suddenly travels near the vehicle 100 without any warning, and thus the occupant is less concerned.

While preferred embodiments according to the present disclosure have been described above, the present disclosure is not limited to these embodiments, and various modifications and changes can be made within the scope of the claims.

What is claimed is:

1. A vehicle control device that is able to autonomously control steering of a vehicle, the vehicle control device comprising:

a necessity determination unit that determines necessity of offset travel in which the vehicle is offset from a center of a traveling lane, in which the vehicle is traveling, to a side opposite to an opposite lane, in which a vehicle travels in a direction opposite to the traveling lane, based on a situation of the opposite lane;

an execution determination unit that determines whether an execution condition for executing the offset travel is met based on a road condition on a side of the vehicle opposite to the opposite lane when the offset travel is necessary; and a vehicle control unit that controls the vehicle, wherein:

the vehicle control unit causes the vehicle to travel using the offset travel when it is determined that the execution condition is met when the offset travel is necessary; and the vehicle control unit performs at least one of restricting an autonomous driving function and notifying an occupant when it is determined that the execution condition is not met when the offset travel is necessary.

2. The vehicle control device according to claim 1, wherein the vehicle control unit is configured to:

make a hands-on request notification that prompts a driver of the vehicle to grip a steering wheel when it is determined that the execution condition is not met when the offset travel is necessary; and make no hands-on request notification when it is determined that the execution condition is met when the offset travel is necessary.

3. The vehicle control device according to claim 1, wherein the vehicle control unit reduces a speed of the vehicle when it is determined that the execution condition is not met when the offset travel is necessary, as compared with when it is determined that the execution condition is met when the offset travel is necessary.

4. The vehicle control device according to claim 1, wherein the vehicle control unit causes the vehicle to travel without using the offset travel and notifies an occupant of the vehicle for warning when it is determined that the execution condition is not met when the offset travel is necessary.

5. A vehicle control method that is able to autonomously control steering of a vehicle, the vehicle control method comprising:

determining necessity of offset travel in which the vehicle is offset from a center of a traveling lane, in which the vehicle is traveling, to a side opposite to an opposite lane, with traffic in a direction opposite to the traveling lane, based on a situation of the opposite lane;

determining whether an execution condition for executing the offset travel is met based on a road condition on a side of the vehicle opposite to the opposite lane when the offset travel is necessary;

causing the vehicle to travel using the offset travel when it is determined that the execution condition is met when the offset travel is necessary; and performing at least one of restricting an autonomous driving function and notifying an occupant when it is determined that the execution condition is not met when the offset travel is necessary.

* * * * *